(12) United States Patent
Lindoff et al.

(10) Patent No.: US 7,555,074 B2
(45) Date of Patent: Jun. 30, 2009

(54) INTERFERENCE ESTIMATION IN THE PRESENCE OF FREQUENCY ERRORS

(75) Inventors: Bengt Lindoff, Bjärred (SE); Mikael Zirén, Malmö (SE); Jonas Ohlsson, Malmö (SE); Johan Nilsson, Höllviken (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 489 days.

(21) Appl. No.: 11/177,532

(22) Filed: Jul. 8, 2005

(65) Prior Publication Data

US 2006/0171449 A1 Aug. 3, 2006

Related U.S. Application Data

(60) Provisional application No. 60/648,940, filed on Feb. 1, 2005.

(51) Int. Cl.
*H03D 1/04* (2006.01)
*H03D 1/06* (2006.01)
*H03K 6/04* (2006.01)

(52) U.S. Cl. .................. 375/346; 375/147; 375/316

(58) Field of Classification Search ................. 375/148, 375/346, 147, 140, 316
See application file for complete search history.

(56) References Cited

U.S. PATENT DOCUMENTS

| | | | |
|---|---|---|---|
| 5,140,615 A * | 8/1992 | Jasper et al. ................ | 375/347 |
| 5,305,349 A | 4/1994 | Dent | |
| 5,659,583 A | 8/1997 | Lane et al. | |
| 5,933,768 A | 8/1999 | Skoeld et al. | |
| 6,363,104 B1 | 3/2002 | Bottomley | |
| 6,606,363 B1 | 8/2003 | Atarius et al. | |
| 6,741,587 B2 * | 5/2004 | Holma et al. ................ | 370/362 |
| 6,754,251 B1 | 6/2004 | Sriram et al. | |
| 6,794,858 B2 | 9/2004 | Ishii | |
| 6,801,565 B1 | 10/2004 | Bottomley et al. | |
| 7,110,765 B2 * | 9/2006 | Amerga et al. ............. | 455/436 |
| 2001/0028677 A1 | 10/2001 | Wang et al. | |
| 2003/0099216 A1 * | 5/2003 | Nilsson et al. ............. | 370/335 |
| 2004/0152423 A1 | 8/2004 | Reznik | |

(Continued)

FOREIGN PATENT DOCUMENTS

WO     02/29978 A2     4/2002

OTHER PUBLICATIONS

Turin, G., "Introduction to Spread-Spectrum Antimultipath Techniques and Their Application to Urban Digital Radio", Proc. IEEE, vol. 68, pp. 328-353 (Mar. 1980).

(Continued)

*Primary Examiner*—David C Payne
*Assistant Examiner*—Brian J Stevens
(74) *Attorney, Agent, or Firm*—Potomac Patent Group PLLC

(57) ABSTRACT

Methods and apparatus for estimating interference level in a receiver are dominated by the receiver's residual frequency error when the interference is low. The interference estimation method can be changed when the interference is low such that it compensates for the effects of residual frequency errors. A method of estimating an interference level includes the steps of detecting an interference level of the received signal; determining whether the detected interference level is low; and if the detected interference level is low, estimating the interference level by at least one of estimating in only a radial direction and de-rotating the received signal before estimating the interference level.

23 Claims, 4 Drawing Sheets

U.S. PATENT DOCUMENTS

2005/0094816 A1  5/2005  Lindoff et al.
2005/0105647 A1  5/2005  Wilhelmsson et al.

OTHER PUBLICATIONS

Cheng, Yunpeng et al., "Adaptive frequency offset estimator without priori signature code synchronization in DS-SS systems", 2002 6th International Conference in Signal Processing, Aug. 26-30, 2002, vol. 2. pp. 1320-1323, ISBN 0-7803-7488-6.

Hong, Dae-Ki et al., "SNR estimation in frequency domain using circular correlation", Electronics Letters, 5th Dec. 2002, vol. 38, No. 25, pp. 1693-1694.

Jalloul, L. et al., "SIR Estimation and Closed-Loop Power Control for 3G", IEEE, Mar. 2003, 0-7803-7954.

Crawford, J., "Making OFDM Work for High-Performance Wireless Network Applications", Magis Networks, Inc., Apr. 2003, M13937 V1.0.

Koo, Chang-Soo et al., "Outer Loop Power Control Using Channel-Adaptive Processing for 3G WCDMA", IEEE, May 2003, 0-7803-7757.

Wang, Haifeng et al., "Adaptive closed-loop frequency compensation for multicarrier transmissions", 2004 IEEE Eighth International Symposium on Spread Spectrum Techniques and Applications, Aug. 30-Sep. 2, 2004, pp. 618-622, ISBN 0-7803-8408-3.

PCT International Search report, mailed May 15, 2006, in connection with International Application No. PCT/EP2006/000916.

PCT Written Opinion, mailed May 15, 2006, in connection with International Application No. PCT/EP2006/000916.

* cited by examiner

FIG. 1        PRIOR ART

INTERFERENCE ESTIMATION IN THE PRESENCE OF FREQUENCY ERRORS

This application claims the benefit of the filing date of U.S. Provisional Patent Application No. 60/648,940 filed on Feb. 1, 2005, the content of which is incorporated here by reference.

BACKGROUND

This invention relates to electronic digital communication systems and more particularly to receivers in wireless communication systems.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS and WCDMA standards. This application focusses on WCDMA systems for simplicity, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (terminals or users), respectively, in the downlink (base-to-terminal) direction. Since all users share the same radio frequency (RF) resource in CDMA systems, it is important that each physical channel does not use more power than necessary. This is achieved by a transmit power control (TPC) mechanism, in which, among other things, base stations send TPC commands to users in the downlink (DL) direction and the users implement the commands in the uplink (UL) direction and vice versa. The TPC commands cause the users to increase or decrease their transmitted power levels by increments, thereby maintaining target signal-to-interference ratios (SIRs) for the dedicated physical channels (DPCHs) between the base stations and the users. The DPCHs include dedicated physical data channels (DPDCHs) and dedicated physical control channels (DPCCHs) in the UL and the DL. A DPDCH carries higher-layer network signaling and possibly also speech and/or video services, and a DPCCH carries physical-layer control signaling (e.g., pilot symbols/signals, TPC commands, etc.). WCDMA terminology is used here, but it will be appreciated that other systems have corresponding terminology. Scrambling and channelization codes and transmit power control are well known in the art.

FIG. 1 depicts a communication system such as a WCDMA system that includes a base station (BS) 100 handling connections with, in this example, four mobile stations (MSs) 1, 2, 3, 4. In the downlink, BS 100 transmits to each mobile at a respective power level, and the signals transmitted by BS 100 are spread using orthogonal code words. In the uplink, MS 1-MS 4 transmit to BS 100 at respective power levels. Each BS, which is called a Node B in 3GPP parlance, in the system serves a geographical area that can be divided into one or more cell(s). The BSs are coupled to corresponding radio network controllers (RNCs, not shown in FIG. 1) by dedicated telephone lines, optical fiber links, microwave links, etc. An RNC directs MS, or user equipment (UE), calls via the appropriate BSs, and the RNCs are connected to external networks such as the public switched telephone network (PSTN), the Internet, etc. through one or more core network nodes, such as a mobile switching center (not shown) and/or a packet radio service node (not shown).

WCDMA is designed to operate at low signal-to-noise ratios (SNRs), and therefore the WCDMA algorithms, for instance, the SIR estimators and automatic frequency control (AFC) algorithms, are designed for such scenarios. For example, the SIR estimation algorithm, which is used in the transmit power control (TPC) scheme to achieve sufficient quality of service (QoS), is designed to be used at low SIRS. QoS is often quantified by block error rate (BLER). It will be understood that, in WCDMA systems (and other communication systems that employ direct-sequence (DS) spread-spectrum techniques), the noise (N) includes thermal noise and interference because the spreading of the signals makes interference signals appear noise-like (i.e., spread out in frequency and with a level in the noise floor) due to the interference signals' "wrong" spreading codes.

The SIR is used for inner loop power control because it is assumed to have an almost one-to-one mapping to the BLER. Outer loop power control, which operates with a slow response rate, is also included in WCDMA in order to compensate for residual mismatch between SIR and BLER. Power control and SIR-to-BLER mapping are well known in the art, and are described in, for example, Louay M. A. Jalloul et al., "SIR Estimation and Closed-Loop Power Control for 3G", IEEE pp. 831-835 (2003).

In such a communication system, the BS transmits predetermined pilot symbols on the UE's DPCH. The BS also transmits pilot symbols on a common pilot channel (CPICH), and a UE typically uses the CPICH pilot symbols in estimating the impulse response of the radio channel to the BS. It will be recognized that the UE uses the CPICH pilots for channel estimation, rather than the DPCH pilots, due to the CPICH's typically higher SNR, but the UE still uses the DPCH pilots, mainly for SIR estimation, i.e., for DL power control.

It is also known that a better SIR estimator gives better receiver performance, measured as the amount of power needed for a given BLER target, with lower power needed being better. In order to improve the SIR estimator in WCDMA, one can use the CPICH for the I estimate and use only the DPCH pilots for estimating the S part of the SIR. This is described in, for example, U.S. Patent Application Publication No. 2005/0094816 by Lindoff et al. for "Interference Estimation in CDMA Systems Using Alternative Scrambling Codes". The following five equations express such a SIR estimator.

For the S, the wanted signal estimate $S_i^{DPCH}$ is given by:

$$S_i^{DPCH} = |\hat{h}_{DPCH,i}|^2, \quad \text{Eq. 1}$$

where:

$$\hat{h}_{DPCH,i} = \frac{1}{n_P} \sum_{k=1}^{n_P} u_k^P y_{DPCH,i}^*(k) \quad \text{Eq. 2}$$

and $n_P$ is the number of DPCH pilot symbols $u_k^P$ per slot, $y_{DPCH,i}(k)$ is the de-spread DPCH pilot symbol at the time instant k for rake finger i, and * means complex conjugate.

For the I, the interference signal estimate $I_i^{DPCH}$ is given by:

$$I_i^{DPCH} = \frac{SF_C}{SF_D} I_i^{CPICH} \quad \text{Eq. 3}$$

where $SF_C$ is the spreading factor for the channel, e.g., the CPICH, used to calculate the I estimate, and $SF_D$ is the spreading factor for the channel, e.g., the DPCH, to which the I estimate is to be translated, in case these are different channels, and:

$$I_i^{CPICH} = \frac{1}{N_C - 1} \sum_{k=1}^{N_C} |y_{CPICH,i}(k) - \hat{h}_{CPICH,i} u_k^{CPICH}|^2 \quad \text{Eq. 4}$$

where $u_k^{CPICH}$ is the CPICH pilot symbol k, $\hat{h}_{CPICH,i}$ is the CPICH channel estimate for tap i, $y_{CPICH,i}(k)$ is the de-spread CPICH pilot symbol at time instant k for rake finger i, and $N_C$ is the number of pilot symbols per slot for the channel used to obtain the I estimate. $SF_C$ is typically 256 and the CPICH has ten pilot symbols per slot in a WCDMA communication system. In this example, the CPICH symbols in one slot (i.e., 10 symbols) are used to determine the I-estimate. It will be appreciated that different numbers of symbols may be used, and different communication systems may have different numbers of symbols in a slot.

For the SIR estimate $SIR_{EST}$:

$$SIR_{EST} = \sum_{i=1}^{n_f} \frac{S_i^{DPCH}}{I_i^{DPCH}} \quad \text{Eq. 5}$$

where $n_f$ is the number of rake fingers.

In laboratory tests and benchmark scenarios, good signal quality is often assumed, which is to say that the terminal operates with good SNR. Also in such cases, good terminal behavior is needed, which means that the needed downlink power should be small if the SNR of the CPICH is high. A "non-good" terminal behavior is described below, involving long power control loop transients. In such scenarios, the residual frequency error, which is the frequency error remaining after the AFC has corrected the tuning of the receiver, affects the I-estimate more than it affects the BLER. It will be appreciated that a SIR-to-BLER mapping that is heavily dependent on the interference level changes the SIR reference value in the outer loop power control, and due to the slow response of the outer loop power control, long transients occur, in which the downlink power level is set too high. Thus, erroneous SIR estimates are obtained in these scenarios.

SUMMARY

It is desirable to avoid the behaviors of current SIR estimation algorithms with better algorithms for estimating interference I (and SIR) in the presence of residual frequency errors. The inventors have observed that in scenarios where the interference is low, the I-estimation process is dominated by the residual frequency error. This affects the SIR estimate but not the BLER, and therefore, when situations having low interference are detected, the I-estimation strategy, which is a part of estimating the SIR, can be changed such that it compensates for the effects of residual frequency errors.

According to one aspect of the invention, there is provided a method of estimating an interference level of a signal received in a receiver. The method includes the steps of detecting an interference level of the received signal; determining whether the detected interference level is low; and if the detected interference level is low, estimating the interference level by at least one of estimating in only a radial direction and de-rotating the received signal before estimating the interference level.

According to another aspect of the invention, there is provided an apparatus for estimating an interference level of a signal received in a receiver. The apparatus includes a detector configured to detect an interference level of the received signal; and a processor configured to determine whether the detected interference level is low, and if the detected interference level is low, to estimate the interference level by at least one of estimating in only a radial direction and de-rotating the received signal before estimating the interference level.

According to yet another aspect of the invention, there is provided a computer-readable storage medium containing a computer program for estimating an interference level of a signal received in a receiver. The computer program performs the steps of detecting an interference level of the received signal; determining whether the detected interference level is low; and if the detected interference level is low, estimating the interference level by at least one of estimating in only a radial direction and de-rotating the received signal before estimating the interference level.

BRIEF DESCRIPTION OF THE DRAWINGS

The various aspects, features, and advantages of this invention will be understood by reading this description in conjunction with the drawings, in which.

DETAILED DESCRIPTION

Figure 1:
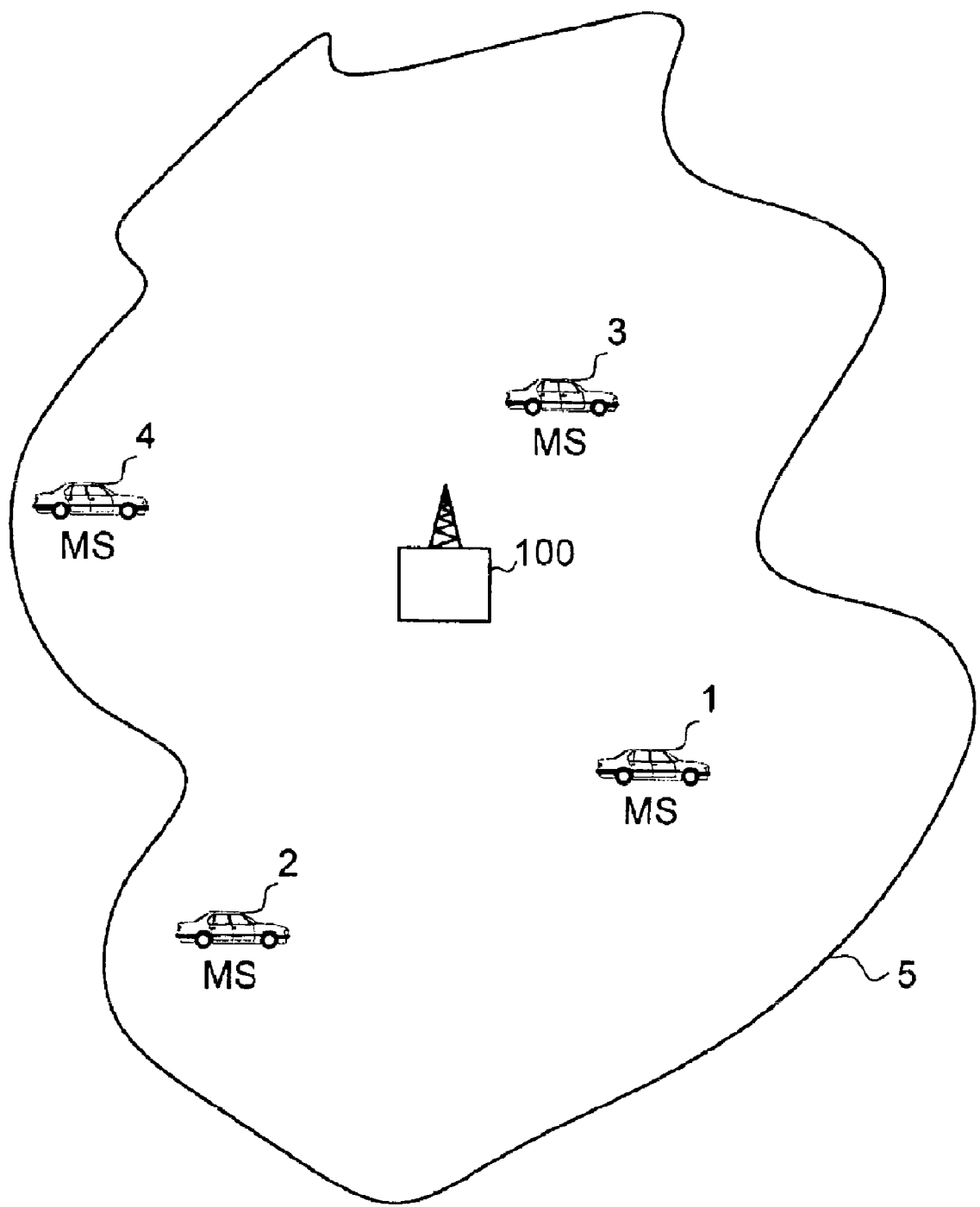
FIG. 1 depicts a communication system.
Figure 2:
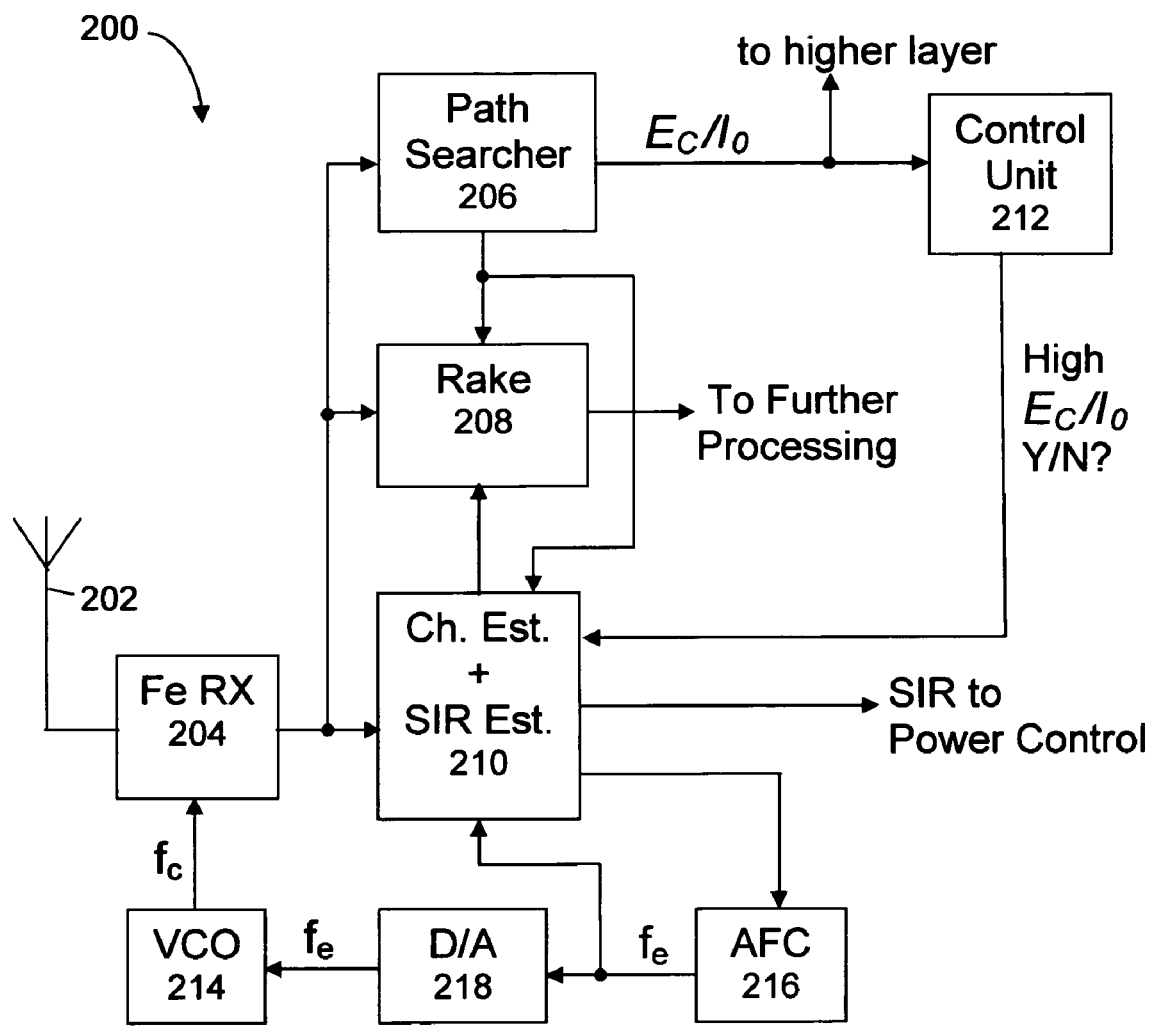
FIG. 2 is a block diagram of an exemplary user equipment in a communication system.

FIG. 2 is a block diagram of a portion of receiver 200, such as a mobile terminal in a WCDMA communication system, that is in accordance with aspects of the invention. A radio signal is received by a suitable antenna 202 and down-converted and sampled to a baseband signal by a front-end receiver (FeRX) 204. The down-conversion is made assuming a carrier frequency $f_C$. The samples of the baseband signal are then fed to a path searcher 206 that correlates the received signal samples with a known pilot signal and estimates a path delay profile, which is fed to a rake combiner 208 and to a channel estimator and SIR estimator 210. The rake combiner 208 and channel estimator 210 de-spread the pilot channel, estimate the impulse response of the radio channel, and de-spread and combine received echoes of the received data and control symbols. Other blocks in FIG. 2 are described below, and it will be understood that the receiver can be implemented by other arrangements of the functional blocks shown in FIG. 2.

Rake combining and channel estimation are well known in the art. Various aspects of rake receivers are described in G. Turin, "Introduction to Spread-Spectrum Antimultipath Techniques and Their Application to Urban Digital Radio", Proc. IEEE, vol. 68, pp. 328-353 (March 1980); U.S. Pat. No. 5,305,349 to Dent for "Quantized Coherent Rake Receiver"; U.S. Pat. No. 6,363,104 to Bottomley for "Method and Apparatus for Interference Cancellation in a Rake Receiver"; and U.S. Pat. No. 6,801,565 to Wang et al. for "Multi-Stage Rake Combining Methods and Apparatus"; and U.S. Patent Application Publication No. 2001/0028677 by Wang et al. for "Apparatus and Methods for Finger Delay Selection in Rake Receivers". Channel estimation is described in, for example, U.S. Patent Application Publication No. 2005/0105647 by Wilhelmsson et al. for "Channel Estimation by Adaptive Interpolation".

Figure 3:
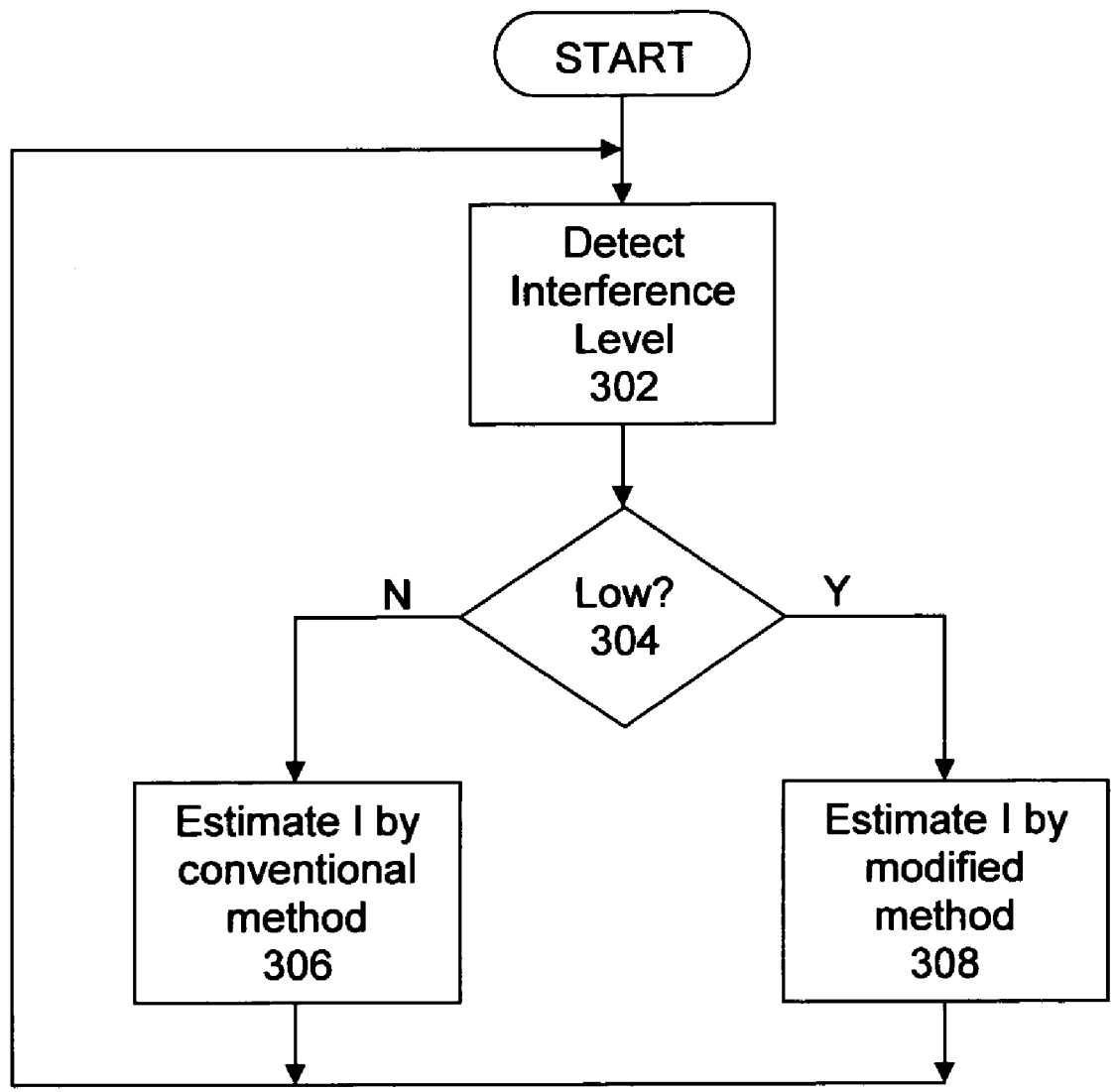
FIG. 3 is a flow chart of a method of estimating an interference level.

As depicted by the flow chart of FIG. 3, methods of estimating interference levels can include or be improved by including a step of detecting an interference level I (step 302) and then determining (step 304) whether the detected I level is low. Situations having low interference can be detected, for example, by estimating the received signal quality, e.g., the ratio of chip energy to interference energy $E_C/I_0$, and then by determining whether that quantity has crossed a threshold. For example, a suitable estimate of the received signal quality is the received signal code power (RSCP) divided by the received signal strength indicator (RSSI), e.g., $E_C/I_0$=RSCP/RSSI, where RSCP=$E_C$ is the signal code power of the CPICH. The signal quality estimate and RSCP and RSSI values are advantageously generated by the path searcher 206, and one or more are provided to higher-layer processes (for handover measurements, for example) and, according to embodiments of this invention, to a control unit (CU) 212. Comparison of the signal quality estimate to the threshold, which may be set through operation of software programming of the control unit, can be performed by a suitably configured or programmed processor CU 212 or even by a suitable comparator. With respect to a suitable value or range of values for the threshold, it is currently believed that the signal level is starting to be good enough when $E_C/I_0$ is about −8 dB for a WCDMA communication system.

It will be understood that situations having low interference levels can be detected in other ways, too. For example, rather than considering the $E_C/I_0$ of the CPICH as described above, the SIR of the CPICH can be considered, according to the following expression:

$$SIR_{EST} = \sum_{i=1}^{n_f} \frac{S_i^{CPICH}}{I_i^{CPICH}}$$  Eq. 6

An advantage of using the SIR rather than $E_C/I_0$ is that the SIR measurement does not include the orthogonal interference that does not affect the performance of the terminal.

It will also be understood that SIR estimation and the other steps of the methods described here are advantageously carried out once per time slot, if the SIR is used, or once per 30-100 milliseconds, if the $E_C/I_0$ ratio is used, in a WCDMA communication system. In other communication systems, these methods are carried out in ways that are system dependent.

If the detected I level is not low, the I estimate can be generated in the conventional way using Eqs. 3 and 4 above (step 306). If the I level is low, i.e., $E_C/I_0$ is high (e.g., greater than −8 dB), that information, which is indicated in FIG. 2 as a yes/no signal, is fed to the channel and SIR estimators 210, which generate an I estimate (step 308) by carrying out an I-estimation method corresponding to that information as explained in more detail below. The estimators 210 also generate estimates of the channel filter taps h in any of several ways that are well known in the art. The h and I estimates are then used by the rake combiner 208 for decoding the received signal, and to generate a SIR estimate that is used in further processing, including in the power control loop in a manner that is known in the art.

I-Estimation Methods

The residual frequency error is typically 0-50 Hz and is currently believed to be the dominant contributor to the interference quantified by the I-estimate. In general, when there is a (small) residual frequency error between the frequency of a received carrier signal and the frequency of the receiver's local oscillator (LO) 214, the de-spread CPICH symbols can be written as:

$$y_{CPICH,i}(k) = e^{j\Delta k} \bar{y}_{CPICH,i}(k)$$  Eq. 7 which is to say that the frequency error can be seen as a symbol rotation by a phase shift $\Delta=2\pi f_e/R_C$ between consecutive symbols k, k+1, where $f_e$ is the residual frequency error, $R_C$ is the symbol rate, and y-bar is the zero-error symbol. For a WCDMA system, $R_C$=(chip rate)/$SF_C$=(3.84 MHz)/$SF_C$, and the symbol rate for the CPICH, for example, having $SF_C$=256, is thus $R_C$=15000 symbols per second, and $N_C$=10 CPICH pilot symbols per slot. For the case of low $E_C/I_0$, the S and I estimates are made conventionally, according to Eqs. 1-4 above, but for the case of high $E_C/I_0$, and therefore interference dominated by the residual frequency error, either or both of the following modified methods can advantageously be used for I-estimation.

Method 1: Estimate I in Only the Radial Direction

In one embodiment of the invention, one modified method of estimating the interference I (excluding interference due to frequency error) for small residual frequency errors (say, less than 50 Hz in a WCDMA system) uses the following equations:

$$I_i^{CPICH} = 2 \cdot \frac{1}{N_C - 1} \sum_{k=1}^{N_C} \mathrm{Re}\left(e^{-j\varphi}(y_{CPICH,i}(k) - \hat{h}_{CPICH,i} u_k^{CPICH})\right)^2$$  Eq. 8 and $$I_i^{DPCH} = \frac{SF_C}{SF_D} I_i^{CPICH}$$  Eq. 9 where $\varphi$ is the angle of $\hat{h}_{CPICH,i}$, Re(x) means the real part of the complex quantity x, and the other quantities are as defined above. The modified method (step 308 in FIG. 3) thus comprises computing an I estimate according to Eqs. 8 and 9. With this I estimate, a SIR estimate can be computed according to Eq. 5 above.

It will be understood that the "radial direction" is parallel to the real coordinate axis due to the compensation with the angle of the channel estimate. It will also be appreciated that in many receivers, the residual frequency error is in the range of 10-60 Hz due to quantization. In order to get good estimates using Method 1, the residual frequency error should be less than about 100 Hz in a WCDMA communication system.

Method 2: De-Rotate the Signal Before Computing I

Figure 4:
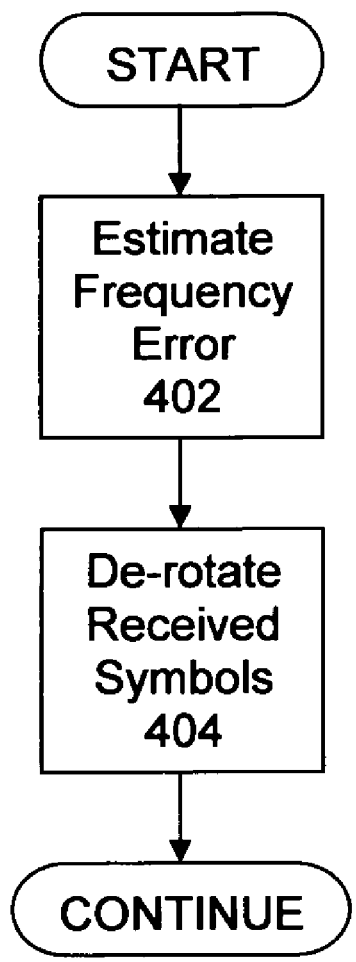
FIG. 4 is a flow chart of a modified method of estimating an interference level.

According to another embodiment of the invention, a modified method of estimating the interference I involves compensating received symbols or samples based on corresponding estimates of the residual frequency error. Estimates of the residual frequency error can be obtained easily from an AFC device 216 in the receiver 200 that operates in a manner that is well known in the art. For example, U.S. Pat. No. 6,606,363 to Atarius et al. describes methods and apparatus for estimating a frequency offset by combining pilot symbols and data symbols, and International Publication No. WO 02/29978 A2 by Dent et al. describes methods and apparatus for automatic frequency control in a CDMA receiver. The steps of such a modified method are depicted in the flow chart of FIG. 4 and include:

estimating the residual frequency error $f_e$ (step 402), e.g., by obtaining such an estimate from the AFC device 216; and de-rotating received CPICH symbols with a corresponding phase shift for each symbol (step 404) according to the following expression:

$$\tilde{y}_{CPICH,i}(k) = e^{-j\Delta k} y_{CPICH,i} = e^{-j2\pi f_e k/R_C} y_{CPICH,i},$$
$$k=1, \ldots, N_C \quad \text{Eq. 10}$$

where $\tilde{y}_{CPICH,i}(k)$ are the de-rotated symbols, $\Delta = 2\pi f_e/R_C$ and the other parameters are as described above.

Then, using the de-rotated symbols $\tilde{y}_{CPICH,i}(k)$, the interference level I and the SIR can be estimated according to Eqs. 1-5 above. It should be understood that Eq. 10 may be used with a channel other than the CPICH, e.g., a DPCH.

In general, Method 2 is "better" than Method 1 from a performance point of view because it corrects for the (estimated) residual frequency error before computing the interference, but Method 2 can be more difficult to implement. Method 1 estimates the noise in only one direction (the radial direction); because the noise in the orthogonal direction is assumed to be the same, the total interference is estimated as twice the interference in the radial direction. Furthermore, Method 1 is a good approximation for small residual frequency errors. It is currently believed that in some implementations, Method 1 is easier than Method 2, but in other implementations, Method 2 is easier than Method 1. It will be understood, of course, that in other implementations, Methods 1 and 2 can be used in combination.

It will be appreciated that procedures described above are carried out repetitively as necessary, for example, to respond to the time-varying nature of communication channels between transmitters and receivers. In addition, this description is written in terms of channels such as the DPCH and CPICH, but it will be understood that other channels may also be suitable. Using the CPICH pilot symbols is advantageous because the CPICH covers the entire area of a cell in a WCDMA system and the pilots are sent continuously. Nevertheless, estimating I on another channel, such as directly on the DPCH, can be done, in which case Eq. 8 uses the DPCH parameters instead and the translation of Eq. 9 is omitted.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless receivers implementing embodiments of this invention can be included in, for example, mobile telephones, pagers, headsets, laptop computers and other mobile terminals, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of estimating an interference level of a signal received in a receiver, comprising the steps of:

detecting an interference level of the received signal;

determining whether the detected interference level is low; and if the detected interference level is low, estimating the interference level by at least one of estimating in only a radial direction and de-rotating the received signal before estimating the interference level;

wherein the radial direction is parallel to a real coordinate axis, and the interference level is estimated in only a radial direction according to $$I_i^{CPICH} = 2 \cdot \frac{1}{N_C - 1} \sum_{k=1}^{N_C} \text{Re}\left(e^{-j\varphi}\left(y_{CPICH,i}(k) - \hat{h}_{CPICH,i} u_k^{CPICH}\right)\right)^2$$

and $$I_i^{DPCH} = \frac{SF_C}{SF_D} I_i^{CPICH}$$

where $I_i^{DPCH}$ is an estimate of an interference level on a first channel DPCH for a receiver tap i, $I_i^{CPICH}$ is an estimate of an interference level on a second channel CPICH for the tap i, k is a time index, $SF_C$ is a spreading factor for the second channel, $SF_D$ is a spreading factor for the first channel, $N_C$ is a number of symbols per slot on the second channel, $\phi$ is an angle of $\hat{h}_{CPICH,i}$, $y_{CPICH,i}(k)$ is a de-spread pilot symbol of the second channel at time instant k for tap i, $h_{CPICH,i}$ is a channel estimate of the second channel for tap i, and $u_k^{CPICH}$ is a pilot symbol of the second channel at time instant k.

2. The method of claim 1, wherein the interference level is detected by estimating a quality of the received signal and determining whether the detected interference level is low includes determining whether the quality has crossed a predetermined threshold.

3. The method of claim 2, wherein the quality is a ratio of chip energy to interference energy.

4. The method of claim 3, wherein the quality is a received signal code power divided by a received signal strength indicator.

5. The method of claim 1, wherein the receiver operates in a wideband code division multiple access wireless communication system.

6. A method of estimating an interference level of a signal received in a receiver, comprising the steps of:
   detecting an interference level of the received signal;
   determining whether the detected interference level is low; and
   if the detected interference level is low, estimating the interference level by at least one of estimating in only a radial direction and de-rotating the received signal before estimating the interference level;
   wherein the received signal is de-rotated by estimating a residual frequency error, and de-rotating symbols in the received signal with a corresponding phase shift for each symbol, the corresponding phase shifts being given by:

$$\tilde{y}_{CPICH,i}(k) = e^{-j2\pi f_e k/R_C} y_{CPICH,i}, \; k=1,\ldots,N_C$$

where $\tilde{y}_{CPICH,i}(k)$ are de-rotated symbols of a channel CPICH, k is an index, $f_e$ is the residual frequency error, $N_C$ is a number of symbols per slot on the channel, and $R_C$ is a symbol rate on the channel, and using de-rotated symbols $\tilde{y}_{CPICH,i}(k)$ to estimate the interference level.

7. The method of claim 6, wherein the interference level is detected by estimating a quality of the received signal and determining whether the detected interference level is low includes determining whether the quality has crossed a predetermined threshold.

8. The method of claim 7, wherein the quality is a ratio of chip energy to interference energy.

9. The method of claim 8, wherein the quality is a received signal code power divided by a received signal strength indicator.

10. The method of claim 6, wherein the receiver operates in a wideband code division multiple access wireless communication system.

11. An apparatus for estimating an interference level of a signal received in a receiver, comprising:
   a detector configured to detect an interference level of the received signal; and
   a processor configured to determine whether the detected interference level is low, and if the detected interference level is low, to estimate the interference level by at least one of estimating in only a radial direction and de-rotating the received signal before estimating the interference level;
   wherein the processor is configured to de-rotate the received signal by estimating a residual frequency error, and de-rotating symbols in the received signal with a corresponding phase shift for each symbol, the corresponding phase shifts being given by:

$$\tilde{y}_{CPICH,i}(k) = e^{-2\pi f_e k/R} c y_{CPICH,i}, \; k=1,\ldots,N_C$$

where $\tilde{y}_{CPICH,i}(k)$ are de-rotated symbols of a channel CPICH, k is an index, $f_e$ is the residual frequency error, $N_C$ is a number of symbols per slot on the channel, and $R_C$ is a symbol rate on the channel, and using de-rotated symbols $\tilde{y}_{CPICH,i}(k)$ to estimate the interference level.

12. The apparatus of claim 11, detector detects the interference level by estimating a quality of the received signal and the processor determines whether the quality has crossed a predetermined threshold.

13. The apparatus of claim 12, wherein the quality is a ratio of chip energy to interference energy.

14. The apparatus of claim 13, wherein the quality is a received signal code power divided by a received signal strength indicator.

15. The apparatus of claim 11, wherein the receiver operates in a wideband code division multiple access wireless communication system.

16. An apparatus for estimating an interference level of a signal received in a receiver, comprising:
   a detector configured to detect an interference level of the received signal; and
   a processor configured to determine whether the detected interference level is low, and if the detected interference level is low, to estimate the interference level by at least one of estimating in only a radial direction and de-rotating the received signal before estimating the interference level;
   wherein the radial direction is parallel to a real coordinate axis, and the processor is configured to estimate the interference level in only a radial direction according to $$I_i^{CPICH} = 2 \cdot \frac{1}{N_C - 1} \sum_{k=1}^{N_C} \mathrm{Re}\left(e^{-j\varphi}\left(y_{CPICH,i}(k) - \hat{h}_{CPICH,i} u_k^{CPICH}\right)\right)^2$$

and $$I_i^{DPCH} = \frac{SF_C}{SF_D} I_i^{CPICH}$$

where $I_i^{DPCH}$ is an estimate of an interference level on a first channel DPCH for a receiver tap i, $I_i^{CPICH}$ is an estimate of an interference level on a second channel CPICH for the tap i, k is a time index, $SF_C$ is a spreading factor for the second channel, $SF_D$ is a spreading factor for the first channel, $N_C$ is a number of symbols per slot on the second channel, $\phi$ is an angle of $\hat{h}_{CPICH,i}$, $y_{CPICH,i}(k)$ is a de-spread pilot symbol of the second channel at time instant k for tap i, $h_{CPICH,i}$ is a channel estimate of the second channel for tap i, and $u_k^{CPICH}$ is a pilot symbol of the second channel at time instant k.

17. The apparatus of claim 16, wherein the detector detects the interference level by estimating a quality of the received signal and the processor determines whether the quality has crossed a predetermined threshold.

18. The apparatus of claim 17, wherein the quality is a ratio of chip energy to interference energy.

19. The apparatus of claim 18, wherein the quality is a received signal code power divided by a received signal strength indicator. at least one of estimating in only a radial direction and de-rotating the received signal before estimating the interference level;

wherein the processor is configured to de-rotate the received signal by estimating a residual frequency error, and de-rotating symbols in the received signal with a corresponding phase shift for each symbol, the corresponding phase shifts being given by:

$$\tilde{y}_{CPICH,i}(k)=e^{-2\pi f_e k/R_C} y_{CPICH,i}, k=1,\ldots,N_C$$

where $\tilde{y}_{CPICH,i}(k)$ are de-rotated symbols of a channel CPICH, k is an index, $f_e$ is the residual frequency error, $N_C$ is a number of symbols per slot on the channel, and $R_C$ is a symbol rate on the channel, and using de-rotated symbols $\tilde{y}_{CPICH,i}(k)$ to estimate the interference level.

20. The apparatus of claim 16, wherein the receiver operates in a wideband code division multiple access wireless communication system.

21. A computer-readable storage medium containing a computer program for estimating an interference level of a signal received in a receiver, wherein the computer program performs the steps of:
  detecting an interference level of the received signal;
  determining whether the detected interference level is low; and
  if the detected interference level is low, estimating the interference level by at least one of estimating in only a radial direction and de-rotating the received signal before estimating the interference level;
  wherein the received signal is de-rotated by estimating a residual frequency error, and de-rotating symbols in the received signal with a corresponding phase shift for each symbol, the corresponding phase shifts being given by:

$$\tilde{y}_{CPICH,i}(k)=e^{-j2\pi f_e k/R_C} y_{CPICH,i}, k=1,\ldots,N_C$$

where $\tilde{y}_{CPICH,i}(k)$ are de-rotated symbols of a channel CPICH, k is an index, $f_e$ is the residual frequency error, $N_C$ is a number of symbols per slot on the channel, and $R_C$ is a symbol rate on the channel, and using de-rotated symbols $\tilde{y}_{CPICH,i}(k)$ to estimate the interference level.

22. The medium of claim 21, wherein the interference level is detected by estimating a quality of the received signal and determining whether the detected interference level is low includes determining whether the quality has crossed a predetermined threshold.

23. A computer-readable storage medium containing a computer program performs the steps of:
  detecting an intrference level of the received signal;
  determining whether the detected interference level is low; and
  if the detected interference level is low, estimating the interference level by at least one of estimating in only a radical direction and de-rotating the recieved signal before estimating the interference level;
  where in the interference level is detected by estimating a quality of the received signal and determining whether the detected interference level is low includes determining whether the quality has crossed a predetermined threshold, and the interference level is estimated in only a radical direction according to $$I_i^{CPICH} = 2 \cdot \frac{1}{N_C - 1} \sum_{k=1}^{N_C} \text{Re}\left(e^{-j\varphi}\left(y_{CPICH,i}(k) - \hat{h}_{CPICH,i} u_k^{CPICH}\right)\right)^2$$

and $$I_i^{DPCH} = \frac{SF_C}{SF_D} I_i^{CPICH}$$

where $I_i^{DPCH}$ is an estimate of an interference level on a first channel DPCH for a receiver tap i, $I_i^{CPICH}$ is an estimate of an interference level on a second channel CPICH for the tap i, k is a time index, $SF_C$ is a spreading factor for the second channel, $SF_D$ is a spreading factor for the first channel, $N_C$ is a number of symbols per slot on the second channel, $\varphi$ is an angle of $\hat{h}_{CPICH,i}$, $y_{CPICH,i}(k)$ is a de-spread pilot symbol of the second channel at time instant k for tap i, $\hat{h}_{CPICH,i}$ is a channel estimate of the second channel for tap i, and $u_k^{CPICH}$ is a pilot symbol of the second channel at time instant k.

* * * * *

UNITED STATES PATENT AND TRADEMARK OFFICE
CERTIFICATE OF CORRECTION

| | | |
|---|---|---|
| PATENT NO. | : 7,555,074 B2 | Page 1 of 1 |
| APPLICATION NO. | : 11/177532 | |
| DATED | : June 30, 2009 | |
| INVENTOR(S) | : Lindoff et al. | |

It is certified that error appears in the above-identified patent and that said Letters Patent is hereby corrected as shown below:

On Page 2, in Item (56), under "OTHER PUBLICATIONS", in Column 1, Line 3, delete "in" and insert -- on --, therefor.

In Column 2, Line 16, delete "SIRS" and insert -- SIRs --, therefor.

In Column 10, Line 65 - Column 11, Lines 1-12, in Claim 19, after "indicator." delete "at least one of..................................estimate the interference level".

In Column 12, Line 2, in Claim 23, after "computer program" insert -- for estimating an interference level of a signal received in a receiver wherein the computer program --.

In Column 12, Line 3, in Claim 23, delete "intrference" and insert -- interference --, therefor.

In Column 12, Line 9, in Claim 23, delete "recieved" and insert -- received --, therefor.

In Column 12, Line 17, in Claim 23, delete "radical" and insert -- radial --, therefor.

Signed and Sealed this

Twenty-second Day of December, 2009

David J. Kappos
*Director of the United States Patent and Trademark Office*